US009607312B2

(12) United States Patent
Lindstrom

(10) Patent No.: US 9,607,312 B2
(45) Date of Patent: Mar. 28, 2017

(54) METHODS AND APPARATUS FOR INCREASING CO-MAILING DISCOUNTS

(71) Applicant: R. R. Donnelley & Sons Company, Chicago, IL (US)

(72) Inventor: Stephen Lindstrom, Naperville, IL (US)

(73) Assignee: LSC COMMUNICATIONS US, LLC, Chicago, IL (US)

( * ) Notice: Subject to any disclaimer, the term of this patent is extended or adjusted under 35 U.S.C. 154(b) by 187 days.

(21) Appl. No.: 13/829,136

(22) Filed: Mar. 14, 2013

(65) Prior Publication Data

US 2014/0278876 A1   Sep. 18, 2014

(51) Int. Cl.
  *G06Q 30/00* (2012.01)
  *G06Q 30/02* (2012.01)
  *B07C 3/00* (2006.01)
  *B07C 1/02* (2006.01)
  *G07B 17/00* (2006.01)

(52) U.S. Cl.
  CPC ............ *G06Q 30/0223* (2013.01); *B07C 1/02* (2013.01); *B07C 3/00* (2013.01); *B65H 2701/1916* (2013.01); *G07B 2017/00475* (2013.01)

(58) Field of Classification Search
  USPC .......................................................... 705/335
  See application file for complete search history.

(56) References Cited

U.S. PATENT DOCUMENTS

| | | | | | |
|---|---|---|---|---|---|
| 4,790,119 | A | * | 12/1988 | McDaniels | 53/411 |
| 5,025,610 | A | * | 6/1991 | Graushar | 53/411 |
| 5,051,914 | A | * | 9/1991 | Sansone | G06Q 99/00 700/223 |
| 5,058,030 | A | * | 10/1991 | Schumacher | 700/220 |
| 5,264,665 | A | * | 11/1993 | Delfer, III | 177/25.15 |
| 5,287,976 | A | * | 2/1994 | Mayer | B07C 1/00 209/547 |
| 5,377,120 | A | * | 12/1994 | Humes et al. | 700/224 |
| 5,987,461 | A | * | 11/1999 | Dreyer et al. | |
| 6,078,897 | A | * | 6/2000 | Rubin | G06Q 30/02 705/14.39 |
| 6,098,057 | A | * | 8/2000 | Dlugos | 705/407 |
| 6,347,260 | B1 | * | 2/2002 | Graushar et al. | 700/223 |
| 7,236,944 | B1 | * | 6/2007 | Schwartz | G06Q 10/08 705/14.36 |

(Continued)

*Primary Examiner* — Brian Epstein
*Assistant Examiner* — Omar Zeroual
(74) *Attorney, Agent, or Firm* — Hanley, Flight and Zimmerman, LLC

(57) ABSTRACT

Methods and apparatus for increasing co-mailing discounts are disclosed. An example method includes determining a first number of first books associated with a first pool, the first books to be addressed for delivery within a geographic region associated with a postal discount. The example method further includes identifying a filler from a second pool to fill open pockets associated with the first pool. The filler corresponds to a first type of book associated with the second pool. The example method also includes identifying a second number of second books associated with the filler to be bundled with the first books when the first number of the first books is less than a threshold number of books for the postal discount. The first number of the first books combined with the second number of the second books is at least as great as the threshold number of books.

22 Claims, 9 Drawing Sheets

(56) References Cited

U.S. PATENT DOCUMENTS

| | | | |
|---|---|---|---|
| 7,693,601 B2* | 4/2010 | Graushar et al. | 700/223 |
| 7,933,681 B2* | 4/2011 | Maitino | 700/224 |
| 8,388,299 B2* | 3/2013 | Ramsey | 414/788.1 |
| 2002/0069186 A1* | 6/2002 | Moore | 705/401 |
| 2004/0064326 A1* | 4/2004 | Vaghi | 705/1 |
| 2004/0085580 A1* | 5/2004 | Kelleher et al. | 358/1.18 |
| 2005/0165704 A1* | 7/2005 | Lopez | G07B 17/00467 705/410 |
| 2005/0197975 A1* | 9/2005 | Benson | G07B 17/00185 705/410 |
| 2005/0256812 A1* | 11/2005 | Yuill | B07C 1/00 705/402 |
| 2006/0287968 A1* | 12/2006 | Brehm | B07C 3/00 705/401 |
| 2007/0260561 A1* | 11/2007 | Martin et al. | 705/403 |
| 2008/0162381 A1* | 7/2008 | Runstrom | G07B 17/00024 705/402 |
| 2008/0294474 A1* | 11/2008 | Furka | 705/7 |
| 2009/0070191 A1* | 3/2009 | Gaito | G06Q 10/0631 705/7.12 |
| 2009/0159508 A1* | 6/2009 | Kostyniuk | B07C 3/00 209/584 |
| 2010/0049536 A1* | 2/2010 | Quine | G06Q 30/04 705/1.1 |
| 2013/0124255 A1* | 5/2013 | Patterson | G06Q 10/04 705/7.27 |

* cited by examiner

FIG. 4

| POOL A 400 | |
|---|---|
| BCT | Quantity |
| A | 500,000 |
| B | 450,000 |
| C | 400,000 |
| D | 350,000 |
| E | 300,000 |
| F | 250,000 |
| G | 200,000 |
| | 2,450,000 |

| POOL B 402 | |
|---|---|
| BCT | Quantity |
| | Open Pocket |
| | Open Pocket |
| | Open Pocket |
| H | 150,000 |
| I | 100,000 |
| J | 50,000 |
| K | 25,000 |
| | 325,000 |

FIG. 5

| POOL A 500 ZipCART: 12345-C027 | |
|---|---|
| BCT | Quantity |
| A | 2 — 504 |
| B | 2 — 506 |
| C | 3 — 508 |
| D | 2 |
| E | 1 |
| F | 9 — 512 |
| G | 2 |
| | 21 |

| POOL B 502 ZipCART: 12345-C027 | |
|---|---|
| BCT | Quantity |
| | |
| | |
| | |
| H | 2 |
| I | 1 — 510 |
| J | 0 |
| K | 1 |
| | 4 |

FIG. 6

| POOL A 600 (ZipCART: 12345-C027) | |
|---|---|
| BCT | Quantity |
| A | 0 — 604 |
| B | 0 — 608 |
| C | 1 — 612 |
| D | 2 |
| E | 1 |
| F | 9 — 512 |
| G | 2 |
| | 15 |

| POOL B 602 (ZipCART: 12345-C027) | |
|---|---|
| BCT | Quantity |
| A | 2 — 606 |
| B | 2 — 610 |
| C | 2 — 614 |
| H | 2 — 616 |
| I | 1 — 510 |
| J | 0 |
| K | 1 |
| | 10 |

| POOL A (ZIP: 12345) | | |
|---|---|---|
| CART | BCT | Quantity |
| C001 | A | 2 |
| C002 | B | 2 |
| C003 | C | 6 |
| C004 | D | 4 |
| C005 | E | 2 |
| C006 | F | 2 |
| C007 | G | 8 |

26

| POOL B (ZIP: 12345) | | |
|---|---|---|
| CART | BCT | Quantity |
| C001 | I | 3 |
| C001 | J | 2 |
| C002 | K | 7 |
| C003 | I | 8 |
| C007 | I | 2 |
| C009 | J | 2 |
| C010 | K | 8 |

| ZIP | CART | POOL A | POOL B | TOTAL |
|---|---|---|---|---|
| 12345 | C001 | 2 | 5 | 7 |
| 12345 | C002 | 2 | 7 | 9 |
| 12345 | C003 | 6 | 8 | 14 |
| 12345 | C004 | 4 | 0 | 4 |
| 12345 | C005 | 2 | 0 | 2 |
| 12345 | C006 | 2 | 0 | 2 |
| 12345 | C007 | 8 | 2 | 10 |
| 12345 | C008 | 0 | 0 | 0 |
| 12345 | C009 | 0 | 2 | 2 |
| 12345 | C010 | 0 | 8 | 8 |

FIG. 8

| POOL A (ZIP: 12345) | | |
|---|---|---|
| CART | BCT | Quantity |
| C001 | A | 2 |
| C002 | B | 2 |
| C003 | | |
| C004 | D | 4 |
| C005 | E | 2 |
| C006 | F | 2 |
| C007 | G | 8 |

20

| POOL B (ZIP: 12345) | | |
|---|---|---|
| CART | BCT | Quantity |
| C001 | I | 3 |
| C001 | J | 2 |
| C002 | K | 7 |
| C003 | | |
| C007 | I | 2 |
| C009 | J | 2 |
| C010 | K | 8 |

24

| POOL B (ZipCART: 12345-C003) | |
|---|---|
| BCT | Quantity |
| C | 6 |
| I | 8 |
| | |
| | |
| | |
| | |
| | |

METHODS AND APPARATUS FOR INCREASING CO-MAILING DISCOUNTS

FIELD OF THE DISCLOSURE

This disclosure relates generally to co-mailing and, more particularly, to methods and apparatus for increasing co-mailing discounts.

BACKGROUND

Discounts for shipping publication, books, and/or other materials via mail can achieved if the materials to be shipped are presorted and bundled in prescribed quantity. Further, the deeper postal presort level achieved, the greater the discounts.

BRIEF DESCRIPTION OF THE DRAWINGS

FIGS. 4-9 provide example tables that illustrate how the co-mailing system of FIG. 2 can be implemented to achieve greater postal discounts.

DETAILED DESCRIPTION

Figure 1:
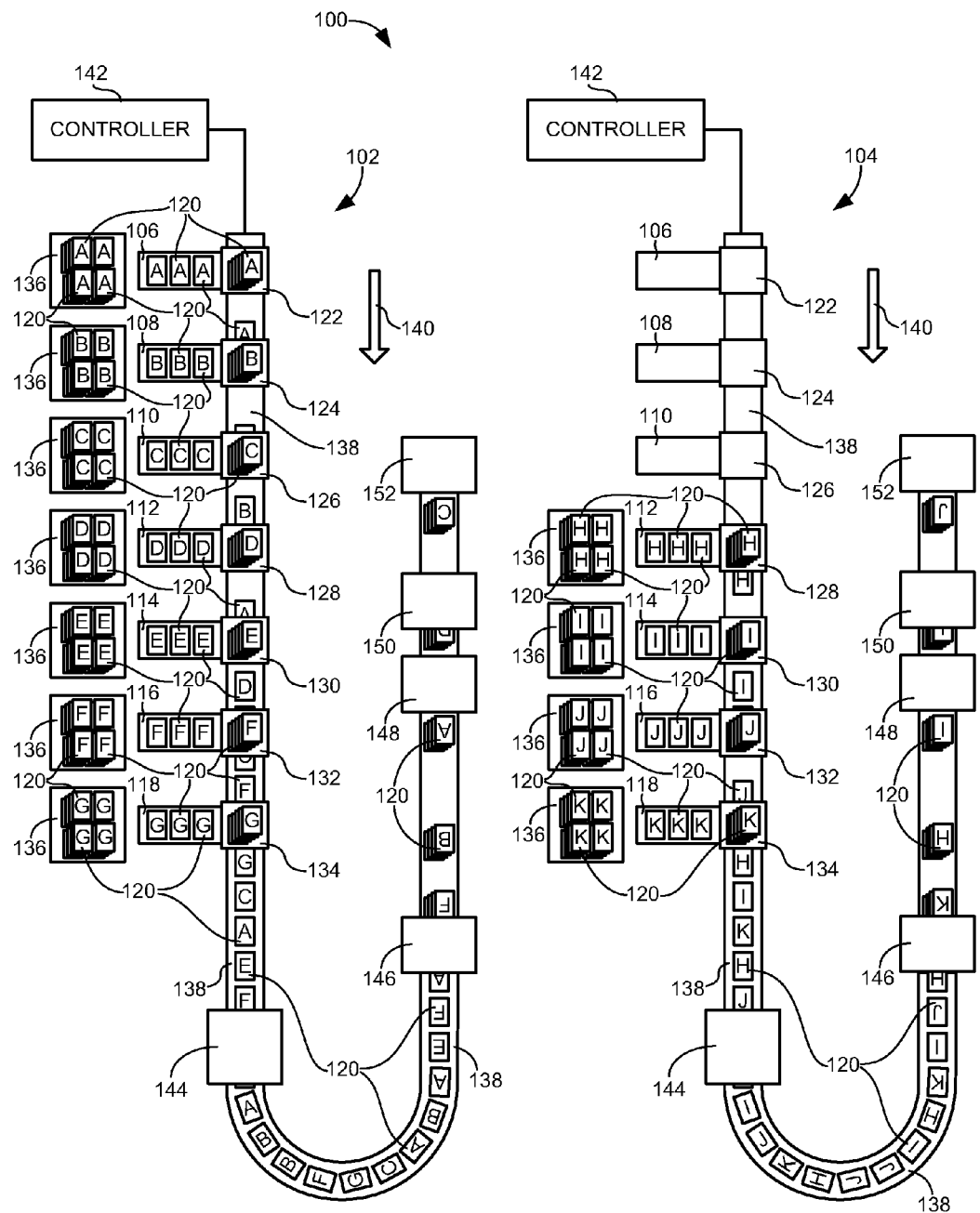
FIG. 1 illustrates an example co-mailing system comprising two co-mailing machines.

Postal services apply postal rate discounts to individuals and/or companies that presort mail to a particular presort level corresponding to differing levels of geographic granularity. For example, presort levels may be associated with mail being bundled together that is addressed to recipients within a particular carrier route (CART) corresponding to the addresses to which a particular carrier delivers mail. Higher presort levels include mail bundled based on addresses associated with the same five digit zip code (or postal code), the same first three digits of the zip code, and the same state or provincial mailing address. The types or forms of mail that may be bundled in this manner include any sort of publication, pamphlet, book, magazine, catalogue, or other mailing items. For clarity of explanation, all of these forms of mail pieces are collectively referred to herein as books.

Typically, each presort level is associated with a different postage rate based on the number of books presorted, the type of mail sorted, and/or the presort level achieved. For example, a CART discount requires at least ten standard books or six periodical books in a carrier bundle (e.g., a package of books addressed within the same carrier route). The same minimum threshold number of books applies for a five-digit discount (e.g., a discount for a bundle of books addressed to the same five digit zip code) and a three-digit discount (e.g., a discount for a bundle of books addressed to the any zip code having the same first three digits). Once the minimum threshold number of books is satisfied for a particular presort level discount, every additional book sorted within the corresponding bundle also qualifies for the presort level discount. Furthermore, the deeper presort level achieved by a bundle, the greater the discount. That is, a five-digit discount provides greater savings than a three-digit discount, and a CART discount provides greater savings than a five-digit discount.

Significantly, a plurality of different books can be combined together within a single bundle to achieve the needed number of pieces to satisfy the threshold for a postal discount at a deeper presort level. Accordingly, in some instances, a company distributing a high volume of books via mail (e.g., magazine publishers) may seek to combine multiple books to create bundles with greater geographic granularity (e.g., associated with deeper presort levels) to benefit from the resulting increase in postal discounts. In some examples, all of the books to be combined may be published by the same company. In other examples, multiple companies may agree to combine their books at a co-mailing facility to have an even larger pool of books from which bundles can be formed to achieve deeper presort levels for their books and/or to obtain the preferred presort levels for a greater number of their books.

Co-mailing facilities typically receive loads (e.g., pallets) of books corresponding to a number of different books that may be fed into one or more co-mailing machines to reorganize the books from their delivered state (e.g., on separate pallets associated with each of the different books) to mixed bundles of the books based on the mailing addresses for each recipient of each copy of each book to achieve better presort level discounts. Each of the different books is associated with a different book configuration type (BCT). The term "book configuration type" is a term of art, which, as used herein, refers to a unique identifier that corresponds to a particular type or group of the same book to be processed at a co-mailing facility. That is, all books corresponding to a particular BCT are the same. Put another way, each book associated with a particular BCT corresponds to a particular run of a particular title (e.g., Sports Illustrated™, Time™, etc.). In some instances, a particular title may have multiple versions (e.g., with variations based on differing target demographics, differing target geographic regions, and/or differing cover wraps, etc.). In such examples, each version of a particular title is delivered to the co-mailing facility in a separate load (e.g., on separate pallets) from other versions and is treated for purposes of the co-mailing process as a different book (e.g., identified with a separate BCT). Accordingly, a particular BCT is sometimes referred to herein as a version group.

Co-mailing machines are often defined by the number of pockets the machine includes. A pocket of a co-mailing machine is a place holder or hopper that holds books of a particular type (e.g., associated with a particular BCT) to be combined with other books located in other pockets. Thus, the number of different books that can be included in a single pool for processing by a single co-mailing machine depends upon the number of pockets. For example, a co-mailing machine with 28 pockets can process a pool of up to 28 different books, whereas a co-mailing machine with 36 pockets can process a pool of up to 36 different books.

In many instances, a co-mailing facility will have multiple co-mailing machines to handle additional books above the limit set by the number of pockets of any one machine. However, as the additional books are processed on a separate machine, they are not organized with the books on the first machine and therefore constitute a second, separate pool of books. For example, assume a particular facility has a first co-mailing machine with 36 pockets and a second co-mailing machine with 28 pockets but receives 40 different books for processing at a time. In such an example, a first pool of 36 different books may be processed by the 36 pocket machine and a second pool of the remaining 4 types of books would be processed by the 28 pocket machine. The larger 36 pocket co-mailing machine is run at full capacity in the above example because achieving the deepest postal presort levels for the greatest number of books depends upon having enough books addressed for each geographic region associated with a particular presort level to at least satisfy the threshold number of books for a corresponding postal discount. Accordingly, the larger the pool of books to be combined, the greater the likelihood of achieving the critical mass necessary to increase (e.g., maximize) the total amount of postal discount based on bundles defined by smaller geographic granularity (e.g., bundles of books associated with particular carrier routes).

In other examples, where fewer different books are to be combined than the number of pockets on a co-mailing machine, but each of the books has very high volume, the co-mailing facility may still use multiple co-mailing machines to process the pool of books. For example, assume there are only 25 different books to be sorted but the volume is such that neither of the 28 pocket co-mailing machine nor the 36 pocket co-mailing machine can adequately complete the co-mailing task within a specified time frame (e.g., one week). In such an example, the 25 books may each be divided such that 25 pockets of the 36 pocket machine are used to process all 25 books and 25 pockets of the 28 pocket machine are also used to process all 25 books (e.g., each co-mailing machine is fed the same 25 books but from different pallets of the 25 books). In such an example, all 25 books would be considered within a single pool even though they are processed multiple machines because the books are divided based on the addresses of the recipients for each book rather than the books being divided based on their BCT. For example, the 36 pocket machine may process all of the books to be sent a first subset states throughout the country, while the 28 pocket machine processes all of the books to be sent to the a complementary subset of the states.

A co-mailing machine processes different books by controlling the order in which the different books are deposited from the respective pockets onto a conveyor that carries the books to be addressed and bundled for mailing. More particularly, a co-mailing machine controls the output order of the books by accumulating all the books addressed to a particular geographic region associated with a particular postal discount. Furthermore, in some examples, the grouping or ordering of the books is based on a preference for deeper presort levels because deeper presort levels provide greater discounts. For example, where enough books are addressed to the same CART to qualify for a CART discount, the books are appropriately ordered in a successive group along the conveyor to be packaged or bundled for the particular CART. If there are not enough books for a CART discount, the co-mailing machine will order or group the books to group all those addressed to the same five-digit zip code (e.g., to achieve a five-digit discount). If a five-digit discount cannot be achieved, the books are ordered to group all books addressed to any zip code having the same first three digits (e.g., to obtain a three-digit discount). Additionally, if a three-digit discount is unavailable, the books will be ordered such that the books are grouped by the same state or provincial mailing address.

Determining the actual order of the books to be deposited on the conveyor is based, at least in part, on recipient data (e.g., recipient addresses) of the recipients of the respective books, which may be stored in a database. In operation, a plurality of different recipient lists (e.g., corresponding to each of the different books) may be combined to generate a combined list or co-mailing file that is analyzed to increase (e.g., optimize) the total amount of postal discounts achieved. In examples where there are multiple pools to be processed (e.g., when there are more different books (e.g., different BCTs) to be sorted than pockets on a single co-mailing machine) each pool will have its own co-mailing file to be analyzed to increase (e.g., optimize) the discounts achieved by the books included within the corresponding pools. Particular methods to determine the ordering of the books to achieve the desired ordering of the books on the conveyor are known in the art and are, thus, not described herein. While the actual method to analyze the co-mailing file(s) for optimization is not described herein, any suitable method to order the books based on the recipient data (e.g., recipient addresses) now known or later developed may be used without departing from the scope of the teachings disclosed herein.

As described above, there are instances where there may be more types of books (e.g., different BCTs) to combine than a particular co-mailing machine can handle. Further, inasmuch as increasing (e.g., maximizing) co-mailing postal discounts are based on grouping enough books at deeper postal presort levels (e.g., a carrier route level rather than a zip code level), it is generally advisable to include as many different books into a common pool for processing. Thus, a first co-mailing machine should be run at full capacity (e.g., using every available pocket) to process a first pool of books and then any remaining books can be processed in a separate pool (and/or more than one additional pool) on additional machines.

While dividing the books into separate pools in this manner may enable the first pool to achieve CART discounts for all or substantially all of the books within the first pool (e.g., 90% or more), the second pool, usually being smaller than the first pool, may achieve CART discounts for a smaller proportion of the books within the pool (e.g., 60%). The reduced discounts achieved in the second pool are exacerbated by the fact that the particular books (e.g., associated with a particular BCT) having the greatest quantity are typically selected for the first pool to increase the total number of books available for combining in the first pool. However, the reduced amount of CART discounts in the second pool is often justified on the basis that the first pool is much larger than the second pool such that, on the whole, a greater amount of discounts were achieved than if the different books were more evenly separated between each of the pools.

While it may be true that a large first pool (e.g., that runs a co-mailing machine at full capacity) and a smaller second pool achieves greater discounts than separating the different books more evenly between two machines, additional discounts may be achieved based on the teachings of this disclosure. In particular, while all or substantially all of the books in the first larger pool qualify for the CART discount, in many instances, each CART bundle may include upwards of forty books. That is, among all the books processed within the first pool, upwards of forty individual books are to be mailed to recipients with addresses associated with a single carrier route. Thus, while each of the forty books benefits from a CART discount, as described above, a much smaller number is actually needed to meet the threshold number (e.g., currently the Post Office requires six books if they are periodicals and ten books if they are standards) to initially qualify for the CART discount. Accordingly, as is described in greater detail below, in some disclosed examples, at least some of the excess or overflow books (above the threshold number) within a particular bundle from the first pool associated with a particular carrier route (CART) are identified to be used with books in the second pool associated with the same CART to create a bundle with a sufficient number of books to qualify for the CART discount. In such examples, because the identified books from the first pool were "excess books" (e.g., books not required to meet the threshold number of books to achieve the CART discount), removing the books does not negate the discount achieved in the first pool but adding the books to the second pool enables the books originally associated with the second pool to achieve a CART discount, which would not have otherwise been available.

Additionally or alternatively, the teachings disclosed herein may be implemented using co-binding machines. Co-binding machines are similar to co-mailing machines except that co-binding machines begin with incomplete books (e.g., signatures) that are to be bound. In some examples, co-binding machines have multiple pockets that can be used to process different books which can be ordered for bundling at particular postal presort levels as described above. In contrast, co-mailing machines begin with completely bound books. Accordingly, where there are two pools of books being processed by two separate co-binding machines, disclosed examples identify excess books from the first pool for inclusion in the second pool to achieve deeper presort levels and, thus, greater discounts in the second pool without affecting the discounts achieved in the first pool.

FIG. 1 depicts an example co-mailing system 100 that can be used to implement the examples disclosed herein. The example co-mailing system 100 of FIG. 1 includes a first co-mailing machine or line 102 and a second co-mailing machine or line 104. As shown in the illustrated example, the co-mailing machines 102, 104 include multiple feeders 106, 108, 110, 112, 114, 116, 118. In the illustrated example, each of the feeders 106, 108, 110, 112, 114, 116, 118 is configured to feed books 120 into corresponding hoppers or pockets 122, 124, 126, 128, 130, 132, 134. In operation, the feeders 106, 108, 110, 112, 114, 116, 118 of the co-mailing machines 102, 104 are loaded with books 120 from pallets 136 located adjacent the feeders 106, 108, 110, 112, 114, 116, 118.

In the illustrated example, each of pallets 136 of books 120, the corresponding feeders 106, 108, 110, 112, 114, 116, 118 and the corresponding pockets 122, 124, 126, 128, 130, 132, 134 correspond to a different book 120 associated with a different book configuration type (BCT). For convenience of explanation, the books 120 in FIG. 1 are labeled with different letters (e.g., A, B, C, D, E, F, G, H, I, J, K) to distinguish the different books within the example co-mailing system 100 of FIG. 1. Furthermore, the letters on each of the books 120 are also used herein to refer to the corresponding BCT for each of the books 120. Thus, as shown in the illustrated example of FIG. 1, each of pallets 136, the corresponding feeders 106, 108, 110, 112, 114, 116, 118, and the corresponding pockets 122, 124, 126, 128, 130, 132, 134 contain the same type of book (e.g., are associated with the same BCT).

Additionally, as shown in the illustrated example, the co-mailing system 100 of FIG. 1 includes eleven different types of books (i.e., different BCTs), which may be eleven different titles and/or different versions of common titles. Further, in the illustrated example, the first co-mailing machine 102 is operating at full capacity with a pool comprising seven of the eleven BCTs (e.g., A, B, C, D, E, F, G) associated with the respective pockets 122, 124, 126, 128, 130, 132, 134 of the first co-mailing machine 102. In contrast, the four remaining BCTs (e.g., H, I, J, K) are grouped in a separate pool associated with four of the pockets 128, 130, 132, 134 of the second co-mailing machine 104 while the remaining three pockets 122, 124, 126 of the second co-mailing machine 104 remain open. While eleven types of books (e.g., eleven different BCTs) are distributed between the two co-mailing machines 102, 104 in the illustrated example, any number of different books could be processed on co-mailing machines having more or less pockets than shown in the illustrated example. Further, how the books 120 associated with different BCTs are distributed between the first and second co-mailing machines 102, 104 is not limited to the illustrated example. Additionally, within which pocket 122, 124, 126, 128, 130, 132, 134 each type of book corresponds may be varied based on the particular needs and circumstances of the pool of books 120 to be combined. Further, which pockets 122, 124, 126, 128, 130, 132, 134 of the second co-mailing machine 104 remain open is not limited to the first three pockets 122, 124, 126 but could be any of the pockets 122, 124, 126, 128, 130, 132, 134.

In the illustrated example, the pockets 122, 124, 126, 128, 130, 132, 134 deposit ones of the corresponding books 120 contained within the respective pockets onto a conveyor 138 that extends the length of the co-mailing machines 102, 104 beneath the pockets 122, 124, 126, 128, 130, 132, 134. In some examples, the conveyor 138 is configured to carry the books 120 deposited thereon past the pockets 122, 124, 126, 128, 130, 132, 134 in a direction generally indicated by arrow 140. To prevent the books 120 from different pockets 122, 124, 126, 128, 130, 132, 134 from being deposited on top of one another as the books 120 are moved along the conveyor, the co-mailing machines 102, 104 in the illustrated examples are provided with a controller or computer system 142. In some examples, the controller 142 is in communication with the pockets 122, 124, 126, 128, 130, 132, 134 and the conveyor 138 to control when books 120 from each pocket 122, 124, 126, 128, 130, 132, 134 are deposited on the conveyor 138. In this manner, the controllers 142, in some examples, facilitate the operation of the co-mailing machines 102, 104 to arrange the books 120 in an order that enables successive books 120 on the conveyor 138 to be packaged or bundled based on the destination addresses for each of the books 120.

In some examples, once the books have been ordered on the conveyor 138 and moved past all of the pockets 122, 124, 126, 128, 130, 132, 134, the books are addressed by an addresser 144. In some examples, the addresser is an imager (e.g., a printer), a print head, a labeler and/or any other suitable device to place personalized indicia (e.g., address information) for particular recipients intended to receive each particular book 120. In the illustrated example, after the books are addressed, the conveyor 138 leads the books 120 to a stacker (e.g., a backend stacker) 146 that sorts and/or packages the books 120. The order in which the stacker 146 places and/or intermingles the different books 120 may correspond to the order in which the books 120 were arranged on the conveyor 138. In other examples, the stacker 146 may adjust the order and/or resort the books 120 to achieve a desired postal discount for all of the books 120. For instance, in some examples, the stacker 146 groups the different books into packages (e.g., bundles) that have the same mailing presort level (e.g., the same CART). The co-mailing system 100 may have any number of stackers 146 (e.g., 1, 2, 3, etc.). In some examples, the co-mailing machines 102, 104 also includes a strapping device 148 to strap each stack or bundle of books 130 stacked by the stacker 146. In some examples, the bundles are stacked and strapped with the same device. Additionally or alternatively, in some examples, the co-mailing machines 102, 104 include a poly bagger or shrink wrapping device 150 to shrink wrap each of the output. In the illustrated example, after the different books are packaged, the packages move along the conveyor 104 to a palletizer 152 that places the different packages onto pallets for shipment.

Although each of the co-mailing machines 102, 104 are shown with seven feeders 106, 108, 110, 112, 114, 116, 118 and seven corresponding pockets 122, 124, 126, 128, 130, 132, 134, the co-mailing machines 102, 104 may be of any suitable size. For example, some known co-mailing machine contain 30 pockets. Additionally, although the co-mailing machines 102, 104 are shown and described as the same, (e.g., having the same number of pockets 122, 124, 126, 128, 130, 132, 134), in some examples, the co-mailing machines 102, 104 are different in size (e.g., different number of pockets), construction, and/or other characteristic that are not inconsistent with the teachings disclosed herein.

Figure 2:
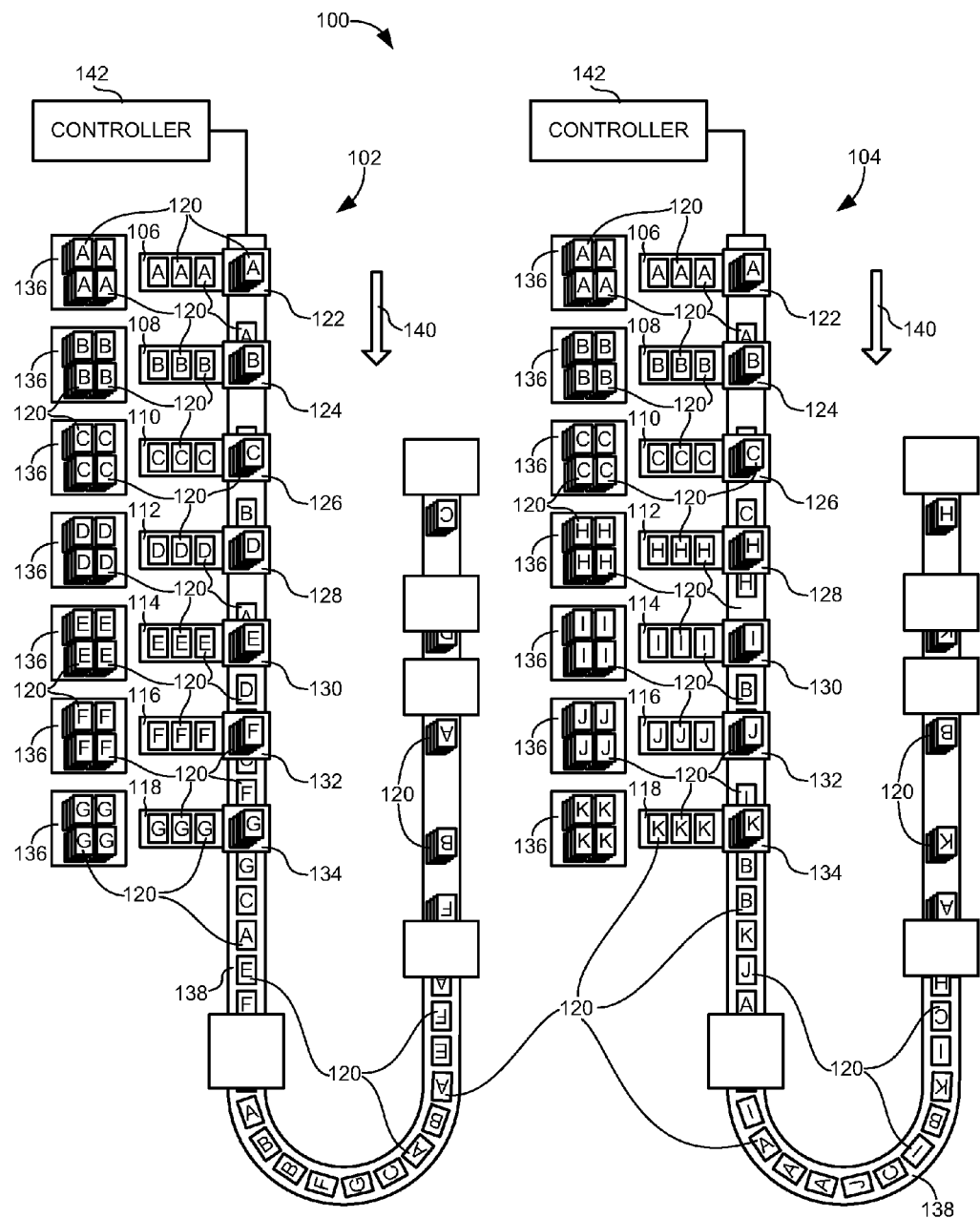
FIG. 2 illustrates the example co-mailing system of FIG. 1 configured to implement the teachings disclosed herein.

FIG. 2 illustrates the example co-mailing system 100 of FIG. 1 implemented according to the teachings disclosed herein. As shown in the illustrated example, in addition to all of the pockets 122, 124, 126, 128, 130, 132, 134 of the first co-mailing machine 102 being utilized (as was shown in FIG. 1), the second co-mailing machine 104 is also now being run at full capacity with each of the pockets 122, 124, 126, 128, 130, 132, 134 being used. In particular, the four remaining BCTs (e.g., H, I, J, K) that were grouped in a second pool associated with four of the pockets 128, 130, 132, 134 of the second co-mailing machine 104 illustrated in the example co-mailing system 100 of FIG. 1 are still associated with the four respective pockets 128, 130, 132, 134. However, rather than leaving the remaining three pockets 122, 124, 126 of the second co-mailing machine 104 open, the pockets 122, 124, 126 are fed by books 120 corresponding to the BCTs associated with the first three pockets 122, 124, 126 of the first co-mailing machine 102 (e.g., A, B, C). While the BCTs A, B, and C are shown as being used to fill the open pockets 122, 124, 126 of the second co-mailing machine 104, any of the books 120 associated with a particular BCT on the first co-mailing machine 102 could alternatively be used. Furthermore, in some examples, only some of the open pockets 122, 124, 126 may be filled while others remain open. Methods to select which of the books 120 corresponding to a particular BCT are used to fill the open pockets 122, 124, 126 of the second co-mailing machine 104 is described in greater detail below.

In some examples, the selected BCTs used to fill the open pockets 122, 124, 126, designated as A, B, and C in the illustrated example, correspond to books 120 that have a wide distribution (or high volume) such that the corresponding books 120 can be shared between the first and second pools associated with the first and second co-mailing machines 102, 104 respectively. That is, the books 120 correspond to the BCTs A, B, and C in the illustrated example are received on enough pallets 136 of the books 120 to be fed into multiple pockets associated with multiple co-mailing machines. Thus, the division of the pallets 136 of similar books 120 (e.g., books 120 associated with the same BCT) is similar to processing a large pool of books on multiple co-mailing machines in known co-mailing systems. However, in the illustrated example, unlike known co-mailing systems, the division of the books 120 for ordering via separate machines cannot be based merely on separate geographic regions because the second co-mailing machine 104 includes a second pool of books 120 (e.g., corresponding to BCTs H, I, J, and K) that may not be limited to a particular geographic region of distribution and/or are intended for addresses in the same geographic regions associated with particular postal presort levels (e.g., same zip code or CART) as the books 120 in the first pool being processed by the first co-mailing machine 102.

Accordingly, in some examples, the particular BCTs (e.g., A, B, C) to be used to fill the open pockets 122, 124, 126 of the second co-mailing machine 104 shown in FIG. 1 are intelligently selected based on the BCTs having excess or overflow books associated with a particular region for a particular presort level. As used herein, "excess books" refers to books 120 to be included within a bundle that qualifies for a particular postal discount but that are not necessary to achieve the particular postal discount (e.g., not needed to meet the threshold number of books required for the postal discount). For example, assume a number of books 120 are all to be bundled and addressed to the same CART and that the total number of books 120 exceeds the threshold number of books required to qualify for a CART discount (e.g., six for periodicals and ten for standards). In such an example, the number of books 120 in excess of the threshold number corresponds to the number of potential "excess books" for that particular bundle. As no particular book 120 to be bundled in such an example is necessarily required to meet the threshold, any of the books 120 could potentially be designated as an "excess book" but the total number of "excess books" cannot exceed the total number of books 120 subtracted by the threshold number.

In the illustrated example, excess books associated with bundles to be produced by a first co-mailing 102 for the first pool are removed from the set of books 120 to be bundled and added to the second pool so that other books 120 can be combined with the excess books addressed to the same geographic region (e.g., the same carrier route) to achieve a corresponding discount (e.g., a CART discount) for the other books 120 as well as the excess books that were moved from the first pool to the second pool. As will be described in greater detail below, individual books are not actually transferred between the first pool and the second pool. Rather, in some disclosed examples, a first co-mailing file containing recipient lists for each of the types of books (e.g., corresponding to particular BCTs) associated with a first pool is analyzed against a second co-mailing file containing recipient lists for each of the types of books associated with a second pool are analyzed to determine excess books from the first pool (e.g., the larger pool that is running at full capacity) and the corresponding records from the first co-mailing file are removed and added to the second co-mailing file.

Once the first and second co-mailing files have been appropriately updated, the controller 142 for each co-mailing machine 102, 104 may analyze the corresponding co-mailing files to increase (e.g., maximize) the postal discounts available for the books 120 within the corresponding pool. As described above, each of the pockets 122, 124, 126, 128, 130, 132, 134 correspond to a particular type of book (e.g., a particular BCT). Accordingly, any books 120 listed in the first co-mailing file associated with the first co-mailing machine 102 (e.g., a book associated with the first pool) to be transferred to the second co-mailing file associated with the second co-mailing machine 104 must be associated with a corresponding pocket of the second co-mailing machine 104. That is, the total number of different books (e.g., associated with different BCTs) that can be designated as excess books within the first pool for use in filling bundles in the second pool is limited to the number of open pockets in the second co-mailing machine. Thus, in the illustrated example, where there are initially three open pockets 122, 124, 126 in the second co-mailing machine 104 (as shown in FIG. 1), a maximum of three different BCTs from the first pool may be divided for use in the second pool by taking some of the pallets 136 of books 120 associated with the identified BCTs and placing them next to the second co-mailing machine 104 to feed the open pockets 122, 124, 126. Accordingly, as described above, while any particular book 120 within a bundle may be identified as an excess book, the BCTs corresponding to the actual excess books that will be used to fill the second co-mailing machine 104 depends upon the BCTs selected to feed the open pockets 122, 124, 126 of the second co-mailing machine 104. The particular BCTs corresponding to the books 120 that are used to fill the open pockets 122, 124, 126 of the second co-mailing machine 104 to are herein referred to as fillers.

Example methods to identify fillers from a first co-mailing pool for a second co-mailing pool are described in greater detail below. In brief, however, in some examples, fillers are identified based on the particular BCTs within the first pool that have a high likelihood of being able to increase (e.g., maximize) the amount of postal discounts corresponding to the deepest presort levels in the second pool. More particularly, in some examples, the BCTs selected as fillers correspond to BCTs that have the widest distribution among the BCTs in the first pool because that increases the likelihood that there will be excess books corresponding to a relatively high proportion of particular carrier routes and/or other regions associated with other presort levels (e.g., five-digit zip code, three-digit zip code, etc.). Accordingly, in some examples, the BCTs identified as fillers correspond to the BCTs associated with a large quantity of individual books 120 to be mailed relative to the other BCTs in the first pool. In some examples, the fillers correspond to the BCTs associated with the largest quantity of books. In some examples, the fillers are identified based on an analysis of the regionalization and/or demographics associated with the distribution of the books 120 associated with the BCTs already within the second pool. For example, if different books 120 within the second pool have distributions limited and/or concentrated to particular geographic/regional areas, and/or are targeted to one or more demographics that have higher concentrations in particular geographic/regional areas, the fillers in some examples may correspond to BCTs associated with books 120 corresponding to similar geographic distributions and/or target similar demographics. In this manner, the increased likelihood that any excess books associated with the fillers will be addressed to similar areas will increase the likelihood that the threshold number of books 120 addressed to a specific CART (or other postal presort level region) will be satisfied.

Figure 3:
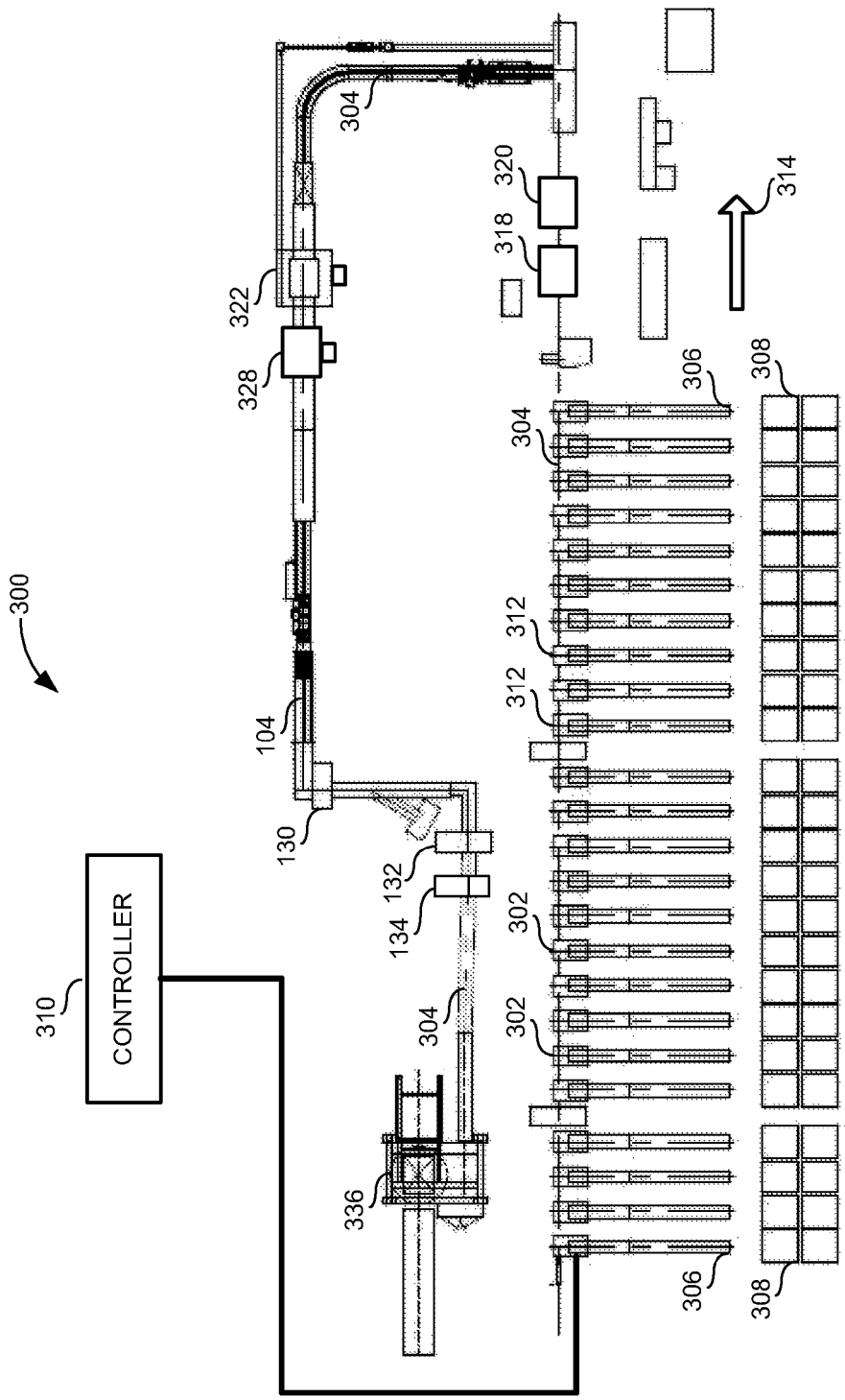
FIG. 3 illustrates an example co-binding machine that may be configured to implement the teachings disclosed herein.

As an alternative to the example co-mailing system 100 of FIGS. 1 and 2, the teachings disclosed herein can also be implemented via a co-binding system comprising co-binding machines, such as the example binding machine 300 illustrated in FIG. 3. The example binding machine 300 of FIG. 3 functions similarly to the co-mailing machines 102, 104 of FIGS. 1 and 2 except that the binding machine 300 begins with signatures of incomplete books to be bound (e.g., glued, stitched, etc.). During such binding processes, the example binding machine 300 may bind different signatures associated with different books. Accordingly, in some examples, during the binding process the books are ordered on a conveyor based on the addresses of recipients of the different books to bundle the books according to deeper postal presort levels to thereby achieve greater discounts when shipping the books to their intended recipients (e.g., in a similar manner to the co-mailing system 100 described above).

In particular, the example binding machine 300 of FIG. 3 includes signature feeders 302 to feed signatures corresponding to books to be bound into respective pockets 312 on a conveyor 304. In some examples, the signature feeders 302 are coupled to respective hoppers 306 that hold at least one signature (e.g., a particular signature corresponding to a particular book) to be fed to the signature feeders 302. One or more of the hoppers 306 may be coupled to at least one additional hopper 308 positioned adjacent the at least one of the hoppers 306 to hold additional signatures to increase the signature capacity of the hoppers 306. Additionally or alternatively, in some examples, multiple hoppers 308 are associated with respective ones of the hoppers 306. In such examples, each of the signature feeders 302 is able to feed a plurality of different signatures onto the conveyor 304 when, for example, a first additional hopper 308 has signatures associated with a first book and a second additional hopper 308 has signatures associated with a second book.

In the illustrated example, the signature feeders 302 feed signatures into the pockets 312 that move along the conveyor 304 in a direction generally indicated by arrow 314. In such examples, as the pockets 312 move in proximity to the front of the signature feeders 302, the respective signature feeders 302 deliver a signature onto one or more of the pockets 312. In this manner, as the pockets 312 move in front of the different signature feeders 302, the pocket 312 receives additional signatures stacked on top of signatures received from previous signatures feeders until the signatures corresponding with a completed book are stacked within respective pockets 312. Accordingly, in some examples, signatures that correspond to the first book may be delivered to a first pocket 312 and signatures that correspond to a second book may be delivered to a second pocket 312.

Once the pockets 312, in the illustrated example, contain the signatures corresponding to an entire book, the pockets 312 carry the stack of signatures along the conveyor 304 to a binder 318 that binds the signatures together (e.g., via stitches, glue, etc.). Further, in some examples, in connection with binding the books, a rejecter 320 checks whether each of the books meets predetermined criteria and/or is defective. In some examples, where book is defective (e.g., too many or two few signatures, misaligned signatures, wrong signatures, etc.) the binding machine 300 will prepare a replacement book that will be ordered along the binding line to be grouped with other books to receive a greater postal discount based on a deeper postal presort level. As a result, in some such examples, one or more of the pockets 312 may be left empty to achieve the correct ordering of the books for bundling of books at the best discount rate. After the books have been stitched and checked, the conveyor 304 in some examples moves the pockets 312 toward a trimmer 322 to cut and/or trim one or more of the edges of the respective books so that all of the pages of the respective books have substantially the same dimensions and/or are flush with one another.

Additionally, as shown in the illustrated example, the binding machine 300 may include an addresser 328, a stacker 330, a strapping device 332, a poly bagger 334, and/or a palletizer 336 that function similarly to the example addresser 144, the example stacker 146, the example strapping device 148, the example poly bagger 150, and the example palletizer 152 described above in connection with the example co-mailing system 100 of FIGS. 1 and 2 to address, stack, sort, and/or package the books into bundles qualifying for postal discounts (e.g., a carrier route discount) and then placed on pallets for shipment. Additionally, as with the co-mailing machines 102, 104 of FIGS. 1 and 2, the binding machine 300 includes a controller 310 that is communicatively coupled to the signature feeders 302 and/or any other device associated with the binding machine 300 to control the operation of the binding machine 300. In some examples, the controller 310 determines the order in which signatures are delivered to the pockets 312 along the conveyor 304 to order the resulting books to improve (e.g., optimize) the postal discounts obtained by bundling books based on the deepest presort level available based on the addresses of the intended recipients of the books.

The teachings of this disclosure may be implemented via co-binding process in a similar manner as described above for the co-mailing system 100 of FIGS. 1 and 2. For example, when a single co-binding machine (such as the co-binding machine 300 of FIG. 3) does not have enough pockets to bind and sort a particular number of different books, a second co-binding machine (e.g., the same or different than the illustrated co-binding machine 100) may be used. In such examples, each co-binding machine corresponds to a separate pool. Further, in such examples, a first pool may be defined by running a first of the co-binding machines at full capacity (e.g., using all available pockets) while the second co-binding machine processes any remaining books. In such examples, a portion of signatures associated with books to be bound in the first pool (corresponding to the first co-binding machine) may be identified to be fed into the second co-binding machine to increase the total size of the second pool and, thereby, increase (e.g., maximize) the postal discounts obtained by grouping the books for delivery to geographic locations having smaller granularity (e.g., based on carrier routes rather than zip codes). The method of identifying the particular signatures corresponding to the books to be used as fillers in the second co-binding machine can be determined in the same manner as described above in connection with the co-mailing system 100 and described in greater detail below. Accordingly, although the teachings described herein are described primarily with reference to co-mailing systems, it should be recognized that the teachings disclosed herein may equally apply to co-binding systems.

FIGS. 4-6 are example tables 400, 402, 500, 502, 600, 602 that illustrate how fillers from a first pool (e.g., pool A) can be used to achieve greater discounts in a second pool (e.g., pool B) without reducing the discounts achieved for the first pool. In particular, the example table 400 of FIG. 4 illustrates the quantity of books (e.g., the books 120 of FIG. 1) corresponding to each type of book (e.g., each BCT of FIG. 1) in the first pool assigned to respective pockets of a first co-mailing machine (e.g., the first co-mailing machine 104 of FIG. 1). The example table 402 of FIG. 4 illustrates the corresponding quantity of books for each BCT assigned to pockets in a second co-mailing machine. The second pool (e.g., pool B of table 402), in the illustrated example, could include three more BCTs because there are three open pockets on the second co-mailing machine (e.g., the open pockets 122, 124, 126 of the second co-mailing machine 104 of FIG. 1). As shown in the illustrated example, the BCTs with the largest quantities are all in the first pool (e.g., pool A) such that pool comprises a total pool of 2,450,000 books whereas pool B contains only 325,000 books. Based on the difference in size between pool A and pool B, pool A will have a much higher likelihood of obtaining the best discounts at the deepest presort levels for more of the books within the pool.

Although the size of pool A increases the amount of discounts achieved, in some instances a particular discount corresponding to a particular bundle of books will have excess books (e.g., there will be more books than necessary to meet the threshold number of books to qualify for the discount). For example, tables 500, 502 illustrate the total number of books from each BCT corresponding with the same ZipCART code. A ZipCART code (also referred to herein ZipCART combination or simply ZipCART) is a code that identifies a particular carrier route by identifying the zip code corresponding to the carrier route and the corresponding carrier route number. As shown in the illustrated example, each of the BCTs in pool A correspond to at least one book that is to be mailed to the particular carrier route (e.g., identified by ZipCART code 12345-C027) and the combined total for the carrier route is 21. Assuming the books associated with the BCTs are standards, only ten books are required to obtain a CART discount. Thus, eleven of the books addressed to the particular CART are excess books. In contrast, the combined total of books associated with the BCTs in Pool B is only four books. As a result, the books in pool B addressed to the particular CART of the illustrated example would need at least six more books to meet the ten book threshold (e.g., for standard mail) to obtain a CART discount. Because there are more excess books for the bundle of books identified in pool A (e.g., eleven books) than the number of books needed (e.g., six books) to create a bundle that qualifies for a CART discount in pool B, in accordance with the teachings disclosed herein, in some examples, at least six books from the pool A bundle will be grouped with the books in pool B.

In some examples, fillers from a first pool of books (e.g., pool A) are identified to fill the open pockets associated with a second pool (e.g., pool B). In some examples, the BCTs having a large quantity of books relative to other BCTs in the first pool are selected to serve as fillers. In particular, in some examples, the BCTs having the largest quantity of books (e.g., A, B, C in the illustrated examples as shown from the chart 400 of FIG. 4) are used because they will, on average, have the greatest number of books associated with every potential carrier route associated with books in pool B that needs additional books to meet the discount number to qualify for a CART discount. Thus, although the BCT designated with F in pool A of the illustrated example includes nine books for the particular CART, which is more than enough books to satisfy the six additional books needed in pool B to meet the required threshold number for the same CART, there is a greater likelihood that books associated with letter F may have fewer or no books addressed to other CARTs corresponding to addresses for books in pool B.

Accordingly, FIG. 6 illustrates tables 600, 602 that correspond to tables 500, 502 of FIG. 5 after some of the excess books from pool A have been removed from the pool A bundle and included to form a discount qualifying bundle in pool B. More particularly, by identifying BCT letters A, B, C as fillers for pool B, the particular books addressed for delivery to the particular CART in the tables 500, 502 of FIG. 5 (e.g., corresponding to ZipCART code 12345-C027) are designated as excess books that may be excluded from the bundle in pool A and included in the bundle for group B. As a result, as shown by comparing the tables 500, 502 of FIG. 5 with the tables 600, 602 of FIG. 6, the two books in box 504 of graph 500, corresponding to the number of books for the BCT letter A associated with the ZipCART are removed from pool A (leaving zero books in corresponding box 604 of graph 600) and added to pool B in the first open pocket as shown by box 606 in graph 602. The two books in box 506 of graph 500 are removed from pool A (leaving zero books in corresponding box 608 of graph 600) and added to pool B in the second open pocket as shown by box 610 in graph 602. Similarly, in the illustrated example, two of the three books in box 508 of graph 500 are removed from pool A (leaving one book in corresponding box 612 of graph 600) and added to pool B in the third open pocket as shown by box 614 in graph 602.

In this manner, the first group of books 510 (corresponding to the books addressed to the example ZipCART associated with the BCTs originally part of pool B (e.g., H, I, J, K)) can be combined with a second group of books 616 associated with the identified fillers (e.g., BCT letters A, B, and C) taken from pool A that are addressed to the same ZipCART to achieve the threshold number of books to satisfy the requirements of a CART discount for the books in pool B. Furthermore, removing the second group of books 616 from the bundle of books in pool A associated with the example ZipCART does not affect the discount for the remaining books in pool A because the second group of books 616 were excess books that were not needed to meet the threshold number of books (e.g., 10) to obtain the discount.

As shown in the illustrated example, one book associated with BCT letter C, which corresponds to a filler, was left in pool A (as shown at box 612 of graph 600) because the book was not needed to reach the threshold number of books (e.g., 10) based on the number of books in the first group of books 510 (e.g., 4) combined with the number of books in the second group of books 616 (e.g., 6). However, as the remaining book associated with BCT letter C in pool A is also unnecessary to meet the threshold number (e.g., the book is also an excess book), in some examples, the remaining book shown in box 612 is also removed to pool B. Accordingly, in some examples, the number of filler books in the first pool (e.g., pool A) moved to the second pool (e.g., pool B) is based on the minimum amount of books needed to achieve a discount bundle in the second pool. In other examples, the number of filler books in the first pool (e.g., pool A) moved to the second pool (e.g., pool B) is the maximum amount of filler books available to be moved (e.g., all of the filler books). In this manner, the total volume of books processed by each co-mailing machine associated with each pool is more evenly distributed. In still other examples, where more excess filler books are available than needed, the fillers used in each of the pools may be divided between the pools in any suitable manner.

Whether there are more available filler books than needed and/or whether there are enough available filler books to achieve a greater discount in a second pool while maintaining discounts already achieved in a first pool depends upon the number of books associated with BCTs other than the fillers that are addressed to the particular geographic region associated with a particular postal discount. For example, the graphs 500, 600 of FIGS. 5 and 6 identify a third group of books 512 corresponding to non-filler BCTs associated with the example ZipCART. As shown in the illustrated example, the number of books in the third group of books 512 amounts to 14 such that no filler books are needed to reach the threshold number of 10. If, however, the number of books in the third group of books 512 was only 9, then the remaining book shown in box 612 of graph 600 corresponding to BCT letter C would need to remain in pool A to keep the CART discount achieved for the example bundle of books. Further, if the number of books in the third group of books 512 was less than 9, then there would not be enough excess filler books to satisfy the threshold number of books for both pools. In some such examples, no books from pool A would be moved to pool B for the particular ZipCART. Even though a deeper presort level may be unavailable for the books in pool B, in some examples, one or more of the books associated with the identified fillers (e.g., BCT letters A, B, C) may nevertheless be moved to pool B, if the books qualify as excess books, to even out the total volume of books processed in each of the pools.

Additionally, in some examples, if the number of books in the third group of books 512 is zero (e.g., no books associated with the BCT letters D, E, F, or G are to be addressed to the example ZipCART), all of the corresponding filler books in pool A would be moved to pool B. In this manner, all of the books to be addressed to the particular ZipCART can be processed in a single bundle by the co-mailing machine associated with pool B and the co-mailing machine associated with pool A would not need to process any books associated with the particular ZipCART. Furthermore, in some such examples, all of the books in pool A are moved to be combined with the corresponding books in pool B (that would not otherwise qualify for the discount), regardless of whether there are enough books in pool A to achieve a discount bundle in both pool A and pool B. That is, in some examples, all books from pool A are moved even if meeting the discount in pool B could be achieved using only the excess books from pool A.

FIGS. 7-9 are example tables 700, 702, 800, 900, 902, 904 that further illustrate how the examples disclosed herein may use fillers from a first pool (e.g., pool A) to increase discounts available in a second pool (e.g., pool B). The example tables 700, 702 of FIG. 7 are similar to tables 500, 502 of FIG. 5 except that tables 700, 702 list the quantity of books for multiple ZipCART codes. More specifically, tables 700, 702 correspond to the same zip code (e.g., 12345), but list the quantities of books from each BCT addressed to different carrier routes within the zip code (e.g., CART numbers C001, C002, C003, C004, C005, C006, C007, C008, C009, C010 ). As shown in the illustrated example, no particular CART number in either pool is associated with enough books to qualify for a CART discount (e.g., no particular CART includes at least 10 books). However, the combined total for the books in the table 700 is 26 and the combined total for books in the table 702 is 32. As a result, the books in both pool A and pool B at least qualify for a five-digit discount because the tables 700, 702 correspond to a single five-digit zip code and the combined total is over the threshold number of ten.

The example table 800 is a combination of both the tables 700, 702 (e.g., corresponding to both pools A and B) with an additional column that provides the combined total of books from both pools for each ZipCART code (e.g., for each CART within the example zip code). As shown in the illustrated example, the total books from both pools corresponding to CART number C003 and C007 meet the threshold level of ten books (e.g., assuming standard mail) to qualify for a CART discount. Accordingly, there is the possibility for the books from each pool to be combined to thereby achieve a greater discount (e.g., a CART discount rather than the five-digit discount originally available) as is illustrated in FIG. 9. In particular, the tables 900 and 902 correspond to the tables 700, 702 of FIG. 7 except that the tables 900, 902 show the books corresponding to ZipCART number 12345-C003 removed (as excess books in the five-digit bundles) to form a new bundle of books that qualifies for a CART discount (as shown in table 904). In such an example, the five-digit bundles associated with pool A and pool B (represented by the tables 900, 902) still have a combined total greater than 10 to retain the corresponding discount but the removed from each original five-digit bundle and placed in the new bundle (e.g., represented by the table 904) now qualify for a CART discount. Thus, the overall discount achieved for both pools is increased.

In some examples, although the books corresponding to BCT letter I in pool B (represented by the table 702) may be described as "being removed" from the five-digit bundle associated with pool B (represented by the table 902), in operation, all discounts available at the CART presort level are determined first and then discounts associated with higher presort levels are determined. That is, upon analyzing the co-mailing files for the two pools, the bundles associated with the CART discount achieved by the books in the table 904 may be determined first and then the remaining books in associated with the same five-digit zip code are identified for bundling according to the tables 900, 902. In this manner, an increased (e.g., maximum) amount of postal discounts are achieved because the deeper presort levels corresponds to greater discounts.

Notably, although the books addressed to ZipCART code 12345-C007 from the combined pools satisfies the threshold number of books to achieve a CART discount as shown in the table 800, the corresponding books from each pool are not combined. Based upon the examples described herein, the books associated with ZipCART code 12345-C007 are not combined because the combined total is based on books associated with BCT letter G in pool A, which was not designated as a filler for the open pockets in pool B. As a result, the co-mailing machine process books in the second pool would not be able to incorporate the books associated with BCT letter G. From this example, it can be seen that while selected the BCTs with the largest quantity of books may enable many additional discounts for a second pool (and in some instances the maximum amount of additional discounts), there is likely to always be other potential combinations of books to achieve additional discounts that cannot be achieved (without reverting to a single pool, but this option is generally unavailable based on constraints defined by the number of pockets on a single machine as described above).

While it cannot be expected that every potential discount may be achieved when different books are processed on multiple co-mailing machines, in some examples, some or all of the BCTs in the first pool are analyzed in conjunction with some or all of the BCTs in the second pool to increase (e.g., optimize) each pool that takes into consideration additional factors to identify the fillers other than the quantity of books in the BCTs of the first pool. For instance, in some examples, fillers are identified based on an analysis of the regionalization and/or demographics associated with the distribution of the books associated with the BCTs already within the second pool. In other examples, different scenarios (e.g., different selected fillers) are run through an analysis and compared to identify the scenario that produced the greatest overall discounts. In other examples, a full analysis of all potential combinations of BCTs in the first and second pools may be analyzed to identify an optimal scenario. Accordingly, in some examples, the analysis may not only identify the fillers from the first pool, but actually identify which BCTs should be included within the first pool in the first place.

Furthermore, although the above example has been described in the context of achieving CART discounts, the teachings disclosed herein may additionally or alternatively be implemented to achieve any level of discount associated with any particular presort level. For example, where a maximum number of CART discounts have been obtained (e.g., using books from the identified fillers to create bundles for CART discounts from bundles that would otherwise only qualify for five-digit discounts), in some examples, the remaining books are combined with the fillers to obtain five-digit discounts (e.g., from bundles that would otherwise only qualify for three-digit discounts) Additionally, although the above examples has been described with respect to a first pool and a second pool, the teachings disclosed herein may be suitably adapted to enhance the discounts obtained in a third pool and/or any other number of additional pools by identifying one or more BCTs associated with the first pool (i.e., the largest pool that is running at capacity with each pocket being used) to serve as fillers for open pockets of a co-mailing machine processing books in the third pool (or other additional pool).

Figure 10:
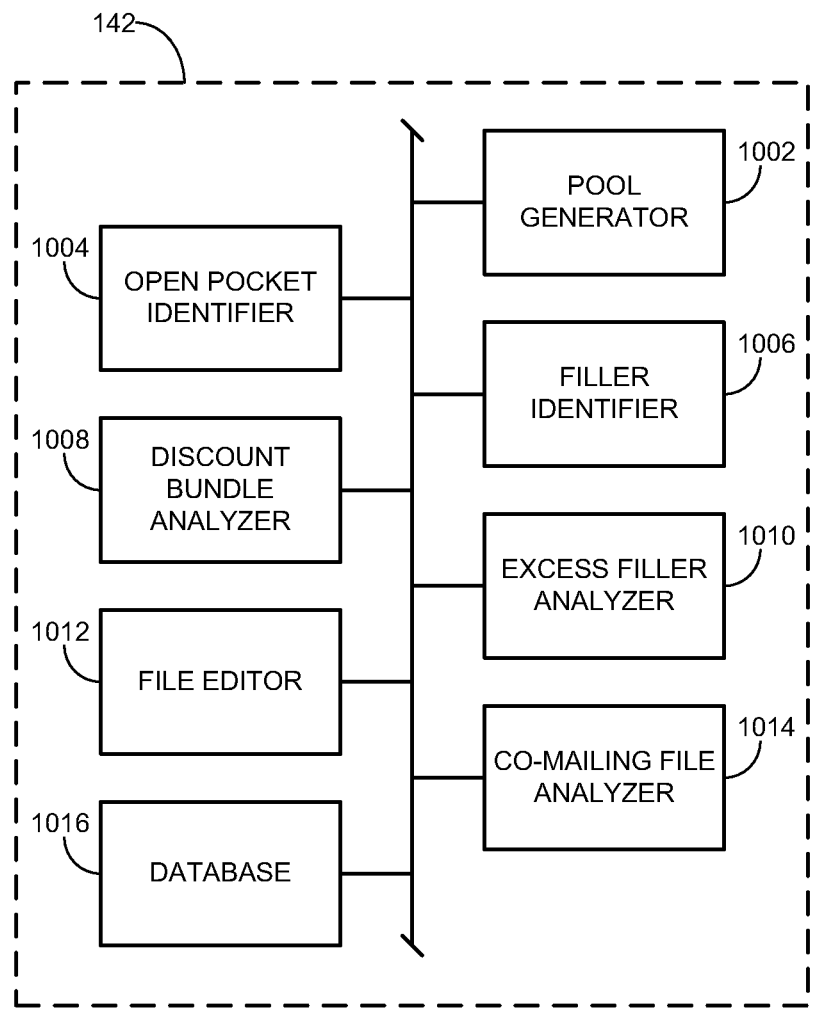
FIG. 10 is an example apparatus constructed in accordance with the teachings disclosed herein to implement the example co-mailing system of FIGS. 1 and 2.

FIG. 10 shows an example configuration of the example controller 142 of FIGS. 1 and 2. In the illustrated example of FIG. 10, the example controller 142 includes an example pool generator 1002, an example pocket identifier 1004, an example filler identifier 1006, an example discount bundle analyzer 1008, an example filler analyzer 1010, an example file editor 1012, an example co-mailing file analyzer 1014, and an example database 1016.

While an example manner of implementing the controller 142 of FIGS. 1 and 2 is illustrated in FIG. 10, one or more of the elements, processes and/or devices illustrated in FIG. 10 may be combined, divided, re-arranged, omitted, eliminated and/or implemented in any other way. Further, the example pool generator 1002, the example pocket identifier 1004, the example filler identifier 1006, the example discount bundle analyzer 1008, the example filler analyzer 1010, the example file editor 1012, the example co-mailing file analyzer 1014, the example database 1016, and/or, more generally, the example controller 142 of FIGS. 1 and 2 may be implemented by hardware, software, firmware and/or any combination of hardware, software and/or firmware. Thus, for example, any of the example pool generator 1002, pocket identifier 1004, the example filler identifier 1006, the example discount bundle analyzer 1008, the example filler analyzer 1010, the example file editor 1012, the example co-mailing file analyzer 1014, the example database 1016, and/or, more generally, the example controller 142 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example pool generator 1002, pocket identifier 1004, the example filler identifier 1006, the example discount bundle analyzer 1008, the example filler analyzer 1010, the example file editor 1012, the example co-mailing file analyzer 1014, and/or the example database 1016 is/are hereby expressly defined to include a tangible computer readable storage device or storage disk such as a memory, a digital versatile disk (DVD), a compact disk (CD), a Blu-ray disk, etc. storing the software and/or firmware. Further still, the example controller 142 of FIGS. 1 and 2 may include one or more elements, processes and/or devices in addition to, or instead of, those illustrated in FIG. 10, and/or may include more than one of any or all of the illustrated elements, processes and devices.

Turning in detail to FIG. 10, the example controller 142 is provided with the example pool generator 1002 to generate the pools corresponding to a set of different books (e.g., designated by different BCTs). In some examples, a first large pool contains as many BCTs as there are pockets on the co-mailing machine to process the first pool. Further, in some such examples, the BCTs associated with the largest quantity of books are selected for the first large pool. The remaining BCTs are then assigned to a second smaller pool (and/or any other number of additional pools necessary to process the entire set of books). In some examples, the pool generator 1002 includes and/or implements a module that reads a parameter file and validates all the mandatory paths associated therewith. Additionally, in some examples, the pool generator 1002 includes and/or implements a module that reads an input file and validates it against a format file. For example, an input file may provide recipient information associated with each book corresponding to one or more BCTs. In such examples, the pool generator 1002 verifies that a Zip, Cart, Zip4, line-of-travel (LOT), and deliver point barcode (DPBC) are present and validates whether the Zip field is a five position numeric within the range of 00501-99999, The example controller 142 is provided with the example pocket identifier 1004 to identify the number of open or empty pockets in the co-mailing machine intended to process the second pool (and/or open pockets of any subsequent pool). In some examples, the pocket identifier 1004 includes and/or implements a module that reads a small pool co-mailing file corresponding to the second pool to determine the available pockets by subtracting the number of BCTs (or version groups) from the total number of available pockets. Additionally, the example controller is provided with the example filler identifier 1006 to identify fillers from the BCTs associated with the first larger pool to fill the open pockets associated with the second smaller pool. In some examples, the filler identifier 1006 identifies the fillers based upon the size of the BCTs in the first pool. For instance, in some examples, the filler identifier 1006 includes and/or implements a module that sorts the BCTs of the first pool by size (e.g., quantity of records) in descending order and selects the largest BCTs corresponding to the number of open pockets identified by the open pocket identifier 1004. In other examples, the filler identifier 1006 may identify the fillers based on other considerations, such as, the geographic distributions and demographics of the BCTs in the both pools. In yet other examples, the filler identifier 1006 may analyze various combinations of fillers to identify the fillers that would provide optimal postal discounts for both pools.

The example controller 142 of FIG. 10 is also provided with the example discount bundle analyzer 1008 to analyze the recipient addresses of particular books within each pool to determine whether groups of the books can qualify for particular discounts associated with particular presort levels. In some examples, the discount bundle analyzer 1008 includes and/or implements one or more modules that calculate whether books addressed to the same geographic region corresponding to a presort level (e.g., the same CART, the same zip code, etc.) in each pool include enough books to satisfy the threshold number associated with the corresponding discount (e.g., six books for periodicals, ten books for standards). More specifically, with respect to CART discounts, in some examples, a first module identifies each ZipCART combination in the second smaller pool with fewer corresponding books than the threshold number required for the CART discount. In this manner, where a group of books already includes the threshold number of books, the corresponding bundle of books will not be identified as a potentially qualifying for a CART upgrade because the discount is already satisfied. In a similar manner, in some examples, a second module identifies each ZipCART combination in the first pool (e.g., the larger pool) having a number of corresponding books that exceed the threshold number required for the CART discount. In some such examples, the second module limits the analysis to ZipCART combinations associated exclusively with books corresponding to the fillers identified by the example filler identifier 1006 described above. In this manner, any excess books associated with the particular ZipCART combinations identified in the first pool can be used to fill the ZipCART combinations identified in the second pool with an insufficient number of books. In other examples, the second module identifies each ZipCART combination in the first pool with more than the threshold number of books regardless of the version group and then excess books associated with the identified fillers are subsequently determined as described below. Additionally, in some instances, the information associated with one or more recipients may not include a specific CART number and/or a LOT. Accordingly, in some examples, the discount bundle analyzer 1008 excludes the records that cannot qualify for a CART discount because a corresponding CART number and/or LOT are unavailable.

In some examples, the discount bundle analyzer 1008 analyzes the recipient addresses of particular books based on the combination of both pools to determine whether groups of the books can potentially qualify for particular discounts associated with particular presort levels if the corresponding books from each pool are combined. For example, the example discount bundle analyzer 1008 may add the total number of books associated with each particular CART (or other particular geographic region associated with a different presort level) and determine whether the combined total meets the threshold number of books to qualify for the CART discount (or other discount). In this manner, the example discount bundle analyzer 1008 may identify potential bundles for postal discounts.

In other examples, rather than analyzing each CART in both pools, the example bundle analyzer 1008 merely analyzes each CART associated with at least one book in the second pool to confirm whether a CART discount for each corresponding CART has been achieved (e.g., whether the books in the second pool satisfy the threshold number without including books from the fillers). For any CARTs (or other geographic regions) within the second pool that do not contain a sufficient number of books to meet the threshold number of a corresponding discount, the example discount bundle analyzer 1008 may identify these books as potential bundles for postal discounts (e.g., once books from the fillers are included).

The example controller 142 is provided with the example filler analyzer 1010 to analyze the potential bundles of discounts (e.g., identified by the discount bundle analyzer 1008) to determine whether there are sufficient excess books associated with the fillers that can be added to the corresponding books in the second pool to meet the threshold number of books to qualify for the corresponding discount. Inasmuch as the filler analyzer 1010 only considers the sufficiency of excess books (e.g., those books within a bundle not required to meet the threshold requirement for a particular discount), any discount achieved by the books in the first pool will remain unaffected. In some examples, the filler analyzer 1010 includes and/or implements a module that matches corresponding ZipCART combinations identified from the second smaller pool (with an insufficient number of books) and the first larger pool (with excess books) to determine whether greater discounts can be achieved by realizing the potential discounts associated with the potential discount bundles identified by the discount bundle analyzer 1008. More particularly, in some examples, the third module first determines whether a ZipCART combination identified in the second pool as potentially qualifying for a discount upgrade corresponds to a ZIPCART combination identified in the first pool as having an overflow of books (e.g., excess books). If so, the example filler analyzer 1010 then determines whether there are a sufficient number of excess books available from the corresponding Zip CART combination in the first pool to be included with the books in the second pool to satisfy threshold number of books associated with the discount. In some examples, where the ZipCART combinations identified from the first pool contain exclusively books associated with identified fillers then the total number of excess books can be moved to the first pool. In other examples, where the ZipCART combinations identified from the first pool contain books other than books associated with identified fillers, only the number of books associated with the fillers that can be designated as excess books are available for filling the potential discount bundle associated with the corresponding ZipCART in the second pool. In either of the above examples, if the filler analyzer 1010 determines that there are enough excess books associated with the fillers in the first pool to be included with correspondingly addressed (e.g., same ZipCART combination) books in the second pool, the excess books are identified in the large pool co-mailing file (corresponding to the first pool) to be moved to the small pool co-mailing file (corresponding to the second pool).

Additionally, the example controller 142 is provided with the example file editor 1012 to revise co-mailing files corresponding to the first and second pools. More specifically, in some examples, where excess books are identified among the fillers to achieve a deeper presort level when combined with books in the second pool, the example file editor 1012 removes the recipient information associated with the identified excess books from a first co-mailing file (e.g., the large pool co-mailing file) and adds the recipient information to a second co-mailing file (e.g., the small pool co-mailing file). In some examples, the file editor 1012 includes and/or implements a module to write an "added" file to an output folder that includes the records (e.g., recipient information) corresponding to books associated with the fillers that were identified for each ZipCART combination in the first large pool to be combined with books associated with the corresponding ZipCART combination in the second small pool to upgrade the discount of the books in the second pool to a CART discount. Further, the module removes the corresponding records from the first co-mailing file (corresponding to the large pool) and writes a resulting revised first co-mailing file to the output folder. In such examples, the module also writes the second co-mailing file (corresponding to the small pool) to output based on the records originally provided in the second small pool. In such examples, the added file and the second co-mailing file are analyzed separately until all the books in each pool are to be analyzed to determine the order in which the books are to be placed, stacked, and bundled on a corresponding co-mailing line.

The example controller 142 of FIG. 10 is also provided the example co-mailing file analyzer 1014 to analyze the first and/or second co-mailing files and generate an order in which the books associated with each pool (including the filler books in the second pool) are to be arranged on a conveyor associated with the respective co-mailing machines. In this manner, the books in each pool may be arranged to increase (e.g., optimize) the discounts achieved for each pool. In some examples, where the file editor 1012 outputs the second co-mailing file (e.g., the small co-mailing file) based on the original records associated with the small file along with a separate added file containing the books removed from the first co-mailing file, the co-mailing file analyzer 1014 takes both the second co-mailing file and the added file as separate inputs to be analyzed to determine the resulting order of books. Further, the example controller 142 is provided the example database 1016 to store the co-mailing files associated with each pool.

Figure 11:
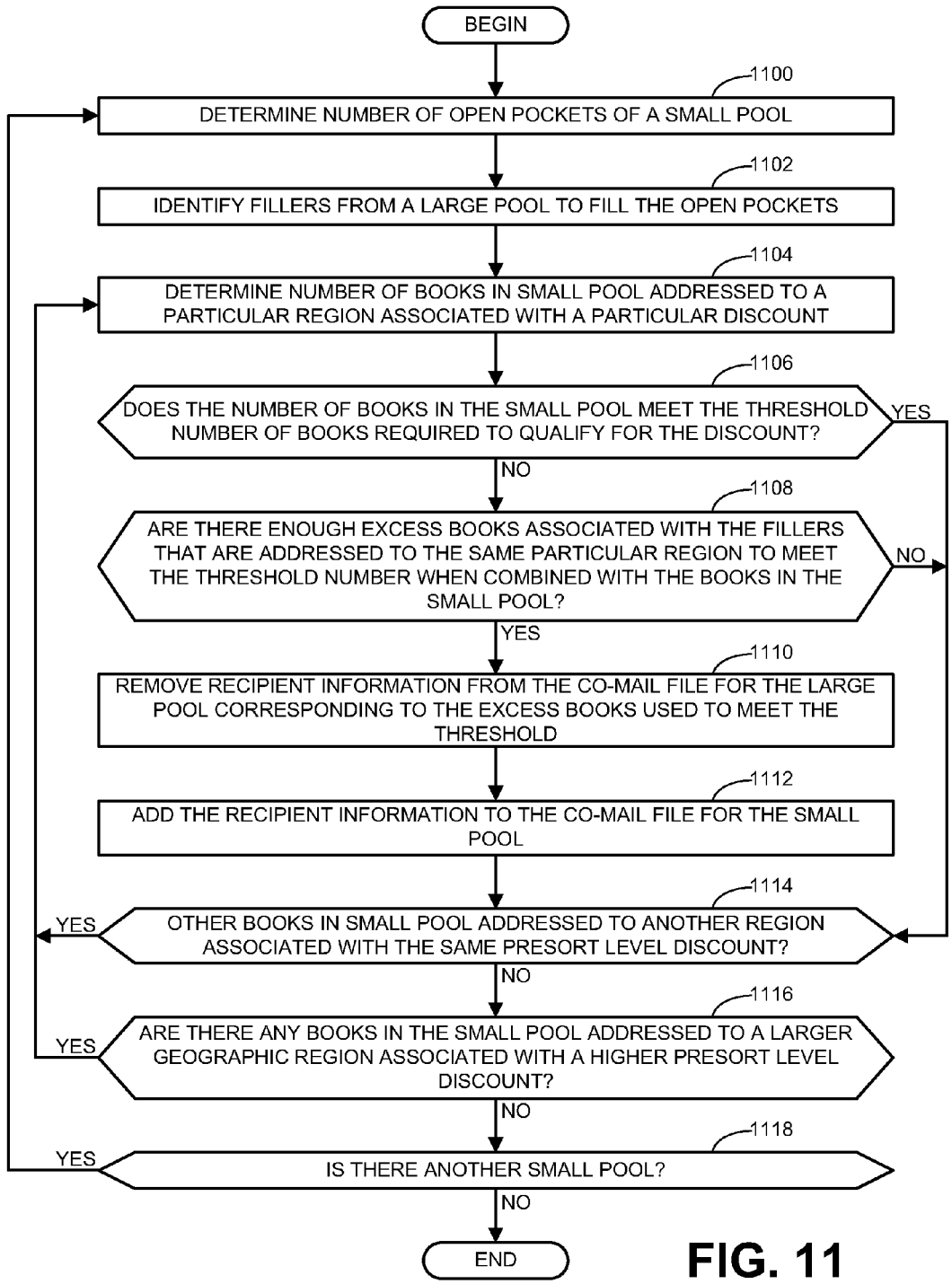
FIG. 11 is a flow diagram representative of an example process, which may be carried out using computer readable instructions that may be executed to implement the example apparatus of FIG. 10, to achieve greater postal discounts via the example co-mailing system of FIG. 2.
Figure 12:
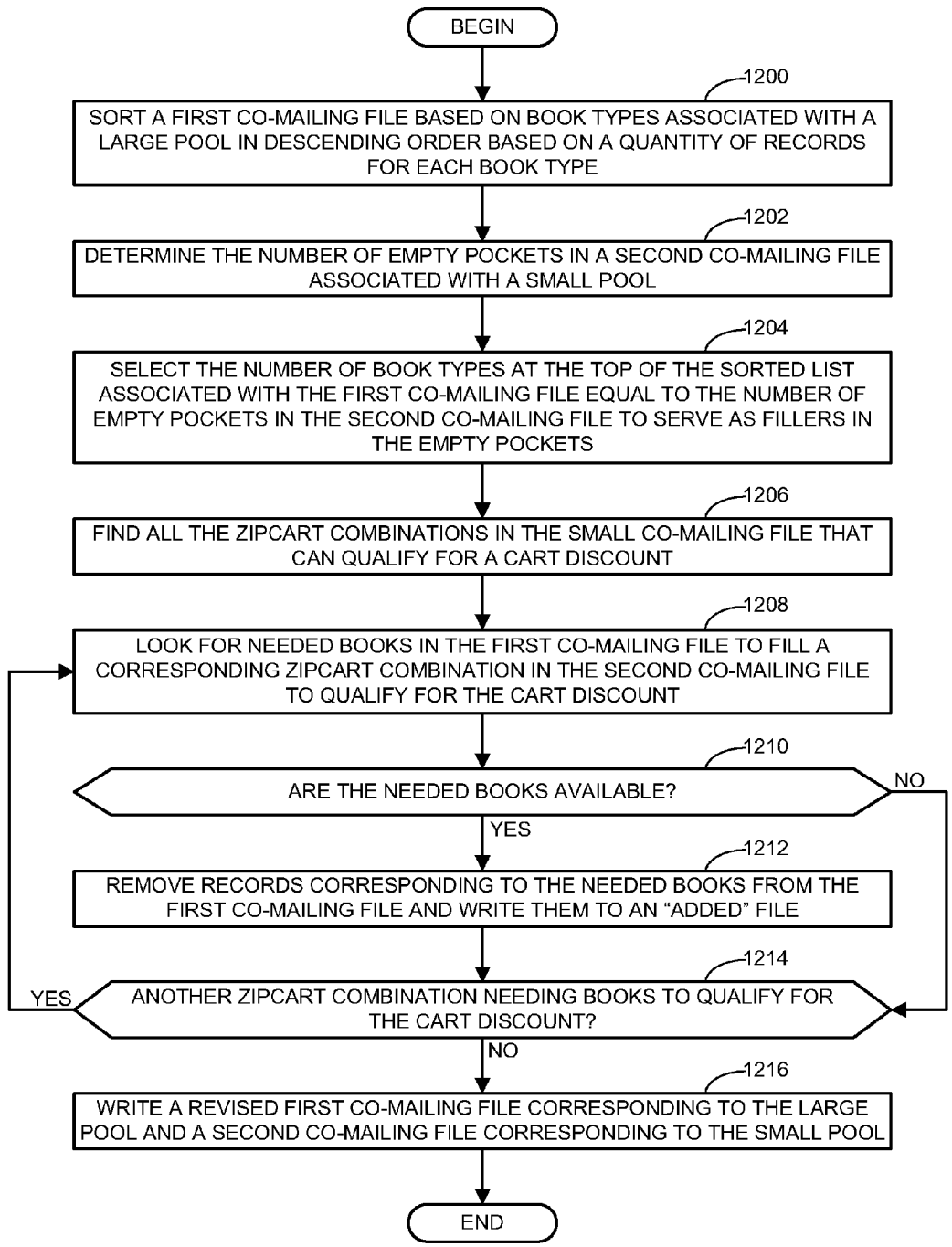
FIG. 12 is a flow diagram representative of another example process, which may be carried out using computer readable instructions that may be executed to implement the example apparatus of FIG. 10, to achieve greater postal discounts via the example co-mailing system of FIG. 2.

A flowchart representative of example machine readable instructions for implementing the example controller 142 of FIG. 10 is shown in FIGS. 11 and 12. In this example, the machine readable instructions comprise a program for execution by a processor such as the processor 1312 shown in the example processor platform 1300 discussed below in connection with FIG. 13. The program may be embodied in software stored on a tangible computer readable storage medium such as a CD-ROM, a floppy disk, a hard drive, a digital versatile disk (DVD), a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowchart illustrated in FIG. 11, many other methods of implementing the example controller 142 may alternatively be used. For example, the order of execution of the blocks may be changed, and/or some of the blocks described may be changed, eliminated, or combined.

As mentioned above, the example processes of FIGS. 11 and 12 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 11 and 12 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

The program of FIG. 11 begins at block 1100 where the open pocket identifier 1004 determines the number of open pockets of a small pool (e.g., the second pool). At block 1102 the filler identifier 1006 identifies the fillers from a large pool (e.g., the first pool) to fill the open pockets of the small pool. At block 1104 the discount bundle analyzer 1008 determines the number of books in the small pool addressed to a particular region associated with a particular discount (e.g., a discount associated with a particular CART, a particular zip code, a particular three-digit zip code).

A block 1106 the example discount bundle analyzer 1008 determines whether the number of books in the small pool meets the threshold number of books required to qualify for the discount. As described above, the threshold number varies depending upon the type of books being combined for mailing. For example, if the books are periodicals the threshold number is six, whereas if the books are standards the threshold number is ten. If the example discount bundle analyzer 1008 determines that the number of books meets the threshold number, control advances to block 1114 where the example discount bundle analyzer 1008 determines whether there are other books in the small pool addressed to another region associated with the same presort level discount. However, if the example discount bundle analyzer 1008 determines that the number of books does not meet the threshold number, control advances to block 1108 where the example filler analyzer 1010 determines whether there are enough excess books associated with the fillers that are addressed to the same particular region to meet the threshold number when combined with the books in the small pool.

If the example filler analyzer 1010 determines that there are not enough excess books to meet the threshold number, control again advances to block 1114 as described above. However, if the example filler analyzer 1010 determines that there are enough excess books to meet the threshold number, control advances to block 1110. At block 1110 the example file editor 1012 removes recipient information from the co-mailing file for the large pool corresponding to the excess books used to meet threshold. At block 1112 the example file editor 1012 adds the recipient information to the co-mailing file for the small pool.

At block 1114 the example discount bundle analyzer 1008 determines whether there are other books in the small pool addressed to another region associated with the same presort level discount. If the example discount bundle analyzer 1008 determines there are other books in the small pool, control returns to block 1104 where the discount bundle analyzer 1008 determines the number of books in the small pool addressed to the other particular region associated with a particular discount. In this manner, the example discount bundle analyzer 1008 iterates through all geographic regions associated with the particular discount at the particular presort level to which at least one book in the small pool is addressed. If the example discount bundle analyzer 1008 determines there are no other books in the small pool to achieve discounts at the same presort level (e.g., the example discount bundle analyzer 1008 analyzes all the books in the small pool for discounts at the designated presort level), control advances to block 1116.

At block 1116, the example discount bundle analyzer 1008 determines whether there are any books in the small pool addressed to a larger geographic region associated with a higher presort level discount. If the example discount bundle analyzer 1008 determines that there are books addressed to larger geographic regions associated with higher presort level discounts, control return to block 1104 to again iterate through the example process. For instance, in some examples, the example discount bundle analyzer 1008 may analyze each of the books within the small pool at the carrier route presort level to determine whether books associated with the fillers can help the books in the small pool meet the threshold number of books to qualify for a CART discount. After having iterated through the entire pool, the example discount bundle analyzer 1008 may determine whether books associated with the fillers can help the books in the small pool meet the threshold number of books to qualify for a zip-code discount (e.g., associated with a higher presort level than for a CART discount). Accordingly, in such examples, the particular region associated with a particular discount during the first iteration of the example process corresponds to particular carrier routes. However, during the second iteration of the example process (e.g., after passing block 1116 a first time), the particular region associated with a particular discount corresponds to particular zip codes. In this manner, by including the fillers from the large pool, discounts at any presort level available for the small pool can be achieves to increase (e.g., maximize) the total amount of discounts realized.

If the example discount bundle analyzer 1008 determines that there are no other books addressed to larger geographic regions associated with higher presort level discounts, control advances to block 1118 where the pool generator 1002 determines whether there is another small pool (e.g., a third pool). If the pool generator 1002 determines that there is another small pool, control returns to block 1100 to repeat the example process of FIG. 11 for the third pool. If the pool generator 1002 determines there is not another small pool, the example process of FIG. 11 ends.

The program of FIG. 12 begins at block 1200 where the example filler identifier 1006 sorts a first co-mailing file based on book types associated with a large pool in descending order based on a quantity of records for each book type. That is, the BCTs or version groups containing the greatest number of books to be mailed are sorted to the top of the list and the BCTs or version groups with fewer books toward the bottom of the list. At block 1202 the example open pocket identifier 1014 determines the number of empty pockets in a second co-mailing file associated with a small pool. At block 1204 the example filler identifier 1006 select the number of books types at the top of the sorted list associated with the first co-mailing file equal to the number of empty pockets in the second co-mailing file to serve as fillers in the empty pockets. For example, if there are three empty pockets in the small pool, the three largest book types (e.g., BCTs) are selected as fillers for the small pool.

At block 1206 the example discount bundle analyzer 1008 finds all the ZipCART combinations in the small co-mailing file that can qualify for a CART discount. In some examples, a list of qualifying ZipCART combinations is generated that corresponds to ZipCART combinations to which fewer books are addressed than the threshold number of books required to obtain a CART discount. That is, in such examples, the example discount bundle analyzer 1008 does not identify ZipCART combinations for which the small pool already qualifies for a CART discount (e.g., already has the requisite number of books). Further, in some such examples, the discount bundle analyzer 1008 only considers the books that can actually qualify for a CART discount in that the recipient information corresponding to each book is associated with a CART number and a LOT.

At block 1208 the example discount bundle analyzer 1008 looks for the needed books in the first co-mailing file to fill a corresponding ZipCART combination in the second co-mailing file to qualify for the CART discount. As described above, the needed books correspond to excess books associated with the ZipCART combination in the first co-mailing file that correspond to the identified fillers. At block 1210 the example excess filler analyzer 1010 determines whether the needed books are available. For example, the excess filler analyzer 1010 determines whether the number of excess books associated with the fillers is equal to or greater than the number of books associated with the ZipCART combination needed in the first pool to meet the threshold number of books for the CART discount. If the example excess filler analyzer 1010 determines that the needed books are available, control advances to block 1212 where the example file editor 1012 removes the records corresponding to the needed books from the first co-mailing file and write them to an "added" file. If the example excess filler analyzer 1010 determines that the needed books are not available (block 1210), control advances to block 1214 where the example discount bundle analyzer 1008 determines whether there is another ZipCART combination needing books to qualify for the CART discount. If the example discount bundle analyzer 1008 determines there is another ZipCART combination, control returns to block 1208 to look for need books for the corresponding ZipCART combination. If the example discount bundle analyzer 1008 determines there are no more ZipCART combination needing books to qualify for the CART discount, the example process advances to block 1216 where the example file editor 1012 write a revised first co-mailing file corresponding to the large pool and a second co-mailing file corresponding to the small pool. In some examples, the revised first co-mailing file corresponds to the original first co-mailing pool except for the needed books that were removed and written in the added file. Additionally, in some examples, the second co-mailing file output by the example file editor 1012 corresponds to the original second co-mailing file because the needed books removed from the first co-mailing file are separately stored in the added file. Once the example file editor 1012 writes out the co-mailing files and added file, the example process of FIG. 12 ends.

Figure 13:
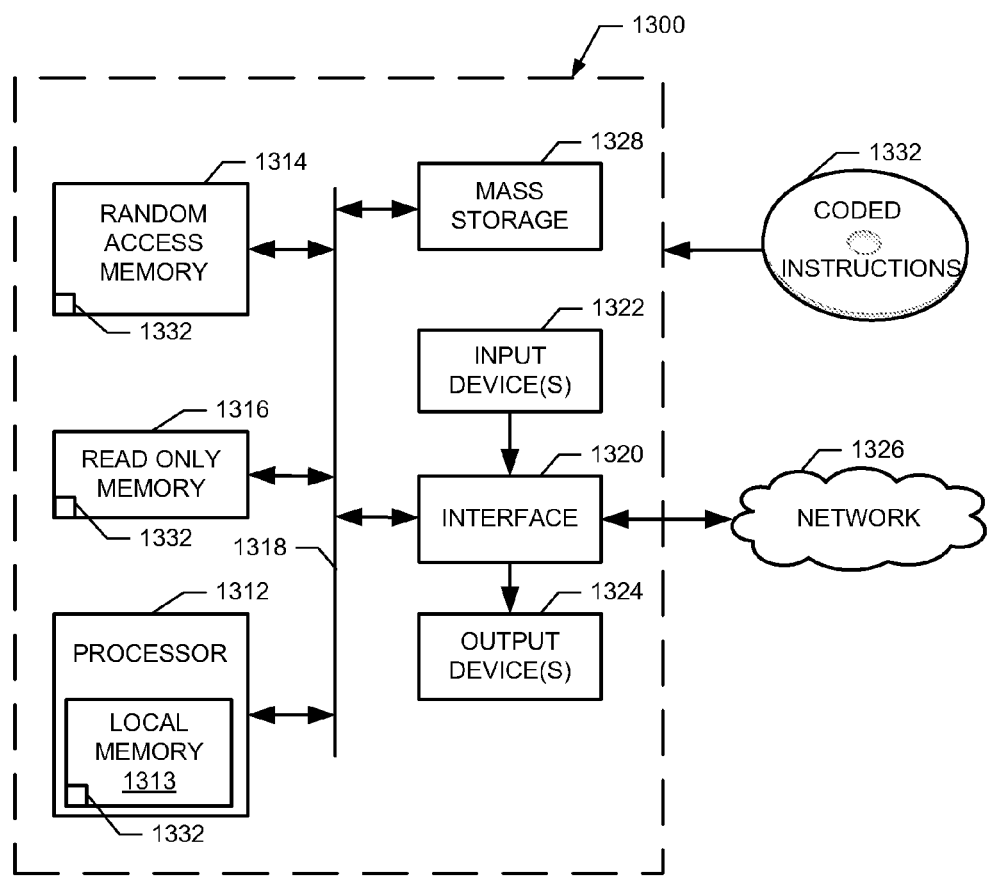
FIG. 13 is a block diagram of an example processor platform capable of executing instructions implementing the processes of FIGS. 11 and/or 12 to implement the example apparatus of FIG. 10.

FIG. 13 is a block diagram of an example processor platform 1300 capable of executing the instructions of FIGS. 11 and/or 12 to implement the controller 142 of FIG. 10. The processor platform 1300 can be, for example, a server, a personal computer, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives.

The coded instructions 1332 of FIG. 11 may be stored in the mass storage device 1328, in the volatile memory 1314, in the non-volatile memory 1316, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   identifying, by a processor, a first pool of books having a number exceeding a first threshold to meet a first postal discount;
   identifying, by the processor, one or more open pockets on a co-mailer machine processing a second pool of books;

identifying, by a the processor, first selected filler books from the first pool of books for bundling with the second pool of books while maintaining a threshold number of books in the first pool to achieve the first postal discount, the first selected filler books identified by:
  calculating a second postal discount based on a first combination of first candidate filler books and the second pool of books;
  calculating a third postal discount based on a second combination of second candidate filler books and the second pool of books;
  performing a discount comparison of the second and third postal discounts; and
  identifying one or more of the first candidate filler books or the second candidate filler books as the first selected filler books based on the discount comparison;
identifying, with the processor, a number of first selected filler books to be bundled with the second pool of books when the number of the second pool of books is less than a second threshold number of books for the second or third postal discount, the number of the second pool of books bundled with the number of the first selected filler books is at least as great as the second threshold number of books; and
executing instructions by the processor to:
  order the second pool of books and the number of the first selected filler books on a conveyor; and
  operate a stacker to bundle the second pool of books with the number of the first selected filler books.

2. The method of claim 1, wherein the first candidate filler books are a first type of book and the second candidate filler books are a second type of book.

3. The method of claim 1, wherein identifying the first selected filler books further comprises:
  comparing a first geographic distribution of the first candidate filler books with a second geographic distribution of the second candidate filler books, the first and second geographic distributions of books compared relative to a postal presort level; and
  identifying the first selected filler books based on the geographic comparison.

4. The method of claim 1, wherein the first selected filler books are to be addressed for delivery within the geographic region associated with the postal discount.

5. The method of claim 1, wherein the postal discount is one of a three-digit discount, a five-digit discount, or a carrier route discount.

6. The method of claim 1 further comprising:
  identifying, with the processor, second selected filler books from the first pool of books for bundling with a third pool of books while maintaining the threshold number of books in the first pool to achieve the first postal discount, the second selected filler books identified by:
    calculating a fourth expected discount based on a third combination of the first candidate filler books and the third pool of books;
    calculating a fifth expected discount based on a fourth combination of the second candidate filler books and the third pool of books;
    performing a second discount comparison of the second expected discount, the third expected discount, the fourth expected discount, and the fifth expected discount; and
    identifying, with the processor, the first candidate filler books or the second candidate filler books as the second selected filler books based on the second discount comparison; and
  identifying, with the processor, a number of second selected filler books to be bundled with the third pool of books when the number of the third pool of books is less than a third threshold number of books for the third or fourth postal discount, the number of the third pool of books bundled with the number of the second selected filler books is at least as great as the third threshold number of books.

7. The method of claim 6 further comprising adjusting the number of first selected filler books to be bundled with the first books based on the number of second selected filler books.

8. The method of claim 7 further comprising:
  conveying the second books on a first co-mailing machine; and
  conveying the third books on a second co-mailing machine.

9. The method of claim 7 further comprising:
  conveying the second books on a co-mailing machine for a first time period; and
  conveying the third books on the co-mailing machine for a second time period after the first time period.

10. The method of claim 1, further including addressing the second pool of books and the number of the first selected filler books that are bundled to a carrier route for delivery.

11. A non-transitory computer readable storage device or storage disc comprising instructions, when executed, cause a machine to at least:
  identify a first pool of books having a number exceeding a first threshold to meet a first postal discount;
  identify one or more open pockets on a co-mailer machine processing a second pool of books;
  identify selected filler books from the first pool of books for bundling with the second pool of books while maintaining a threshold number of books in the first pool to achieve the first postal discount, the selected filler books identified by:
    calculating a second postal discount based on a first combination of first candidate filler books and the second pool of books;
    calculating a third postal discount based on a second combination of second candidate filler books and the second pool of books;
    performing a discount comparison of the second and third postal discounts; and
    identifying one or more of the first candidate filler books or the second candidate filler books as the selected filler books based on the discount comparison;
  identify a number of the selected filler books to be bundled with the second pool of books when the number of the second pool of books is less than a second threshold number of books for the second or third postal discount, the number of the second pool of books bundled with the number of the selected filler books is at least as great as the second threshold number of books;
  order the second pool of books and the number of the selected filler books on a conveyor; and
  operate a stacker to bundle the second pool of books with the number of the selected filler books.

12. The storage device or storage disc of claim 11, wherein the first candidate filler books are a first type of book and the second candidate filler books are a second type of book associated with the second pool.

13. The storage device or storage disc of claim 11, wherein the instructions, when executed, further cause the machine to:
compare a first geographic distribution of the first candidate filler books with a second geographic distribution of the second candidate filler books, the first and second geographic distributions of books compared relative to a postal presort level; and
identify the selected filler books based on the geographic comparison.

14. The storage device or storage disc of claim 11, wherein the selected filler books are to be addressed for delivery within the geographic region associated with the postal discount.

15. A co-mailing machine comprising:
a filler identifier to:
identify a first pool of books having a number exceeding a first threshold to meet a first postal discount;
identify one or more open pockets on a co-mailer machine processing a second pool of books;
identify selected filler books from the first pool of books for bundling with the second pool of books while maintaining a threshold number of books in the first pool to achieve the first postal discount, the selected filler books identified by:
calculating a second postal discount based on a first combination of first candidate filler books and the second pool of books;
calculating a third postal discount based on a second combination of second candidate filler books and the second pool of books;
performing a discount comparison of the second and third postal discounts; and
identifying one or more of the first candidate filler books or the second candidate filler books as the selected filler books based on the discount comparison; and
identify a number of selected filler books to be bundled with the second pool of books when the number of the second pool of books is less than a second threshold number of books for the second or third postal discount, the number of the second pool of books bundled with the number of the selected filler books is at least as great as the second threshold number of books;
a conveyor to order the second pool of books and the number of the selected filler books; and
a stacker to bundle the second pool of books with the number of the selected filler books.

16. The co-mailing machine of claim 15, wherein the first candidate filler books are a first type of book and the second candidate filler books are a second type of book.

17. A method comprising:
calculating, by a processor:
a first expected discount based on a first estimate bundling of a first candidate filler book with first books;
a second expected discount based on a second estimate bundling of the first candidate filler book with second books;
a third expected discount based on a third estimate bundling of a second candidate filler book with the first books;
a fourth expected discount based on a fourth estimate bundling of the second candidate filler book with the second books;
performing, by the processor, a discount comparison of at least two of the first, second, third, and fourth expected discounts;
identifying, by the processor, one or more of the first candidate filler books or the second candidate filler as first selected books for bundling with the first books based on the discount comparison; and
executing instructions by the processor to:
order the first selected books and the first books on a conveyor; and
operate a stacker to bundle the first selected books with the first books.

18. The method of claim 17 further comprising identifying one or more of the first candidate filler books or the second candidate filler as second selected filler books for bundling with the second books based on the discount comparison.

19. The method of claim 18, wherein the first candidate filler books are identified as the first selected books when the first expected discount is greater than either the second expected discount or the third expected discount.

20. The method of claim 18, wherein the first candidate filler books are identified as the first selected books when the first expected discount is less than the second expected discount by a first amount but the fourth expected discount is greater than the third expected discount by a second amount, the second amount greater than the first amount.

21. The method of claim 18, wherein the first candidate filler books are identified as the first selected books when the first expected discount is less than the second expected discount but the fourth expected discount is greater than the third expected discount and a first sum of the first discount and the fourth discount is greater than a second sum of the second discount and the third discount.

22. The method of claim 18, wherein the first selected filler books and the second selected filler books are identified based on a maximum discount of different combinations of the first, second, third, and fourth expected discounts.

* * * * *